United States Patent [19]

Roberto et al.

[11] Patent Number: 5,667,845

[45] Date of Patent: Sep. 16, 1997

[54] TREATMENT TO IMPROVE CORROSION RESISTANCE OF AUTODEPOSITED COATINGS ON METALLIC SURFACES

[75] Inventors: Oscar E. Roberto, Farmington Hills; Shawn E. Dolan, Sterling Heights, both of Mich.

[73] Assignee: Henkel Corporation, Plymouth Meeting, Pa.

[21] Appl. No.: 645,689

[22] Filed: May 14, 1996

Related U.S. Application Data

[63] Continuation of Ser. No. 316,437, Sep. 30, 1994, abandoned, which is a continuation-in-part of Ser. No. 102,660, Aug. 5, 1993, Pat. No. 5,372,853.

[51] Int. Cl.$^6$ .................................................. B05D 3/04
[52] U.S. Cl. ................ 427/337; 427/340; 427/417.8; 427/435; 148/240; 148/247
[58] Field of Search .......................... 427/337, 340, 427/419.8, 435; 148/240, 247, 6.2

[56] References Cited

U.S. PATENT DOCUMENTS

| | | |
|---|---|---|
| 3,167,368 | 1/1965 | Gibbs et al. . |
| 3,585,084 | 6/1971 | Steinbrecher et al. . |
| 3,709,743 | 1/1973 | Dalton et al. . |
| 3,776,848 | 12/1973 | Hall et al. . |
| 3,922,451 | 11/1975 | Anschutz et al. . |
| 3,964,936 | 6/1976 | Das ........................ 148/6.27 |
| 4,030,945 | 6/1977 | Hall et al. ................. 148/6.2 |
| 4,180,603 | 12/1979 | Howell, Jr. . |
| 4,191,676 | 3/1980 | Hall . |
| 4,313,861 | 2/1982 | Bassett et al. . |
| 4,347,172 | 8/1982 | Nishida et al. . |
| 4,366,195 | 12/1982 | Hall . |
| 4,370,177 | 1/1983 | Frelin et al. ............. 148/6.27 |
| 4,617,068 | 10/1986 | King ....................... 148/6.14 |
| 4,636,264 | 1/1987 | Schellenberg et al. .... 148/6.2 |
| 4,636,265 | 1/1987 | Fischer et al. .......... 148/6.15 |
| 4,657,788 | 4/1987 | Benton et al. . |
| 4,800,106 | 1/1989 | Broadbent ............... 427/388.1 |
| 4,853,285 | 8/1989 | Sobata et al. ............ 428/336 |
| 4,971,636 | 11/1990 | Watanabe et al. ........ 148/265 |
| 5,030,323 | 7/1991 | Awad ...................... 156/665 |
| 5,089,064 | 2/1992 | Reghi ...................... 148/247 |
| 5,164,234 | 11/1992 | Siebert ................... 427/419.8 |
| 5,242,714 | 9/1993 | Steele et al. ............. 427/379 |
| 5,342,456 | 8/1994 | Dolan ...................... 148/247 |

*Primary Examiner*—Shrive Beck
*Assistant Examiner*—Brian K. Talbot
*Attorney, Agent, or Firm*—Wayne C. Jaeschke; Norvell E. Wisdom, Jr.; Beatrice N. Robbins

[57] ABSTRACT

A process enhances corrosion resistance of autodeposited coatings on metallic surfaces by contacting the uncured coating on the metallic surface with a reaction rinse solution containing complex fluoride anions. In a preferred use, because the protective properties of the autodeposited coatings are improved on both cold rolled and galvanized steel, both may be processed simultaneously, providing practical and economic advantages.

21 Claims, No Drawings

TREATMENT TO IMPROVE CORROSION RESISTANCE OF AUTODEPOSITED COATINGS ON METALLIC SURFACES

CROSS-REFERENCE TO RELATED APPLICATION

This is a continuation of application Ser. No. 08/316,437 filed Sep. 30, 1994, now abandoned, which is a continuation-in-part of U.S. application Ser. No. 08/102,660 filed on Aug. 5, 1993, now U.S. Pat. No. 5,372,853.

BACKGROUND OF THE INVENTION

1. Field of the Invention

This invention relates to the treatment of autodeposited coatings in order to retain longer or to enhance the corrosion resistance provided by the coatings on metallic surfaces, particularly ferriferrous articles, including zinc coated (also called "galvanized") steel.

2. Statement of Related Art

Autodeposition is a generic term used to describe the deposition of a substantially uniform organic binder containing film on a metal surface, generally preferably precleaned, without the use of externally imposed electric current in the deposition process. Autodeposition involves the use of an aqueous coating composition containing dispersed organic resin, usually at relatively low solids concentration such as 5 to 12%, normally less than 10%, to form a coating of relatively high solids concentration, usually greater than 10%, on a metallic surface immersed therein, with the coating increasing in thickness and mass the longer the time that the metallic surface is immersed in the coating composition. Because the autodeposition process is driven chemically, rather than electrically, it coats wherever the solution wets the surface of the substrate, depositing a relatively uniform coating on even intricate or complex shapes or designs of the substrate.

In general, autodepositing compositions are aqueous acid solutions having solid resin particles dispersed therein in very finely divided form. The coating formed while the metal substrate used is immersed in the bath is generally wet and fairly weak, although sufficiently strong to maintain itself against gravity and moderate spraying forces. In this state the coating is described as "uncured". To make an autodeposition coated object suitable for normal practical use, the uncured coating is dried, usually with the aid of heat. The coating is then described as "cured".

Basic constituents of an autodepositing composition are water, resin solids dispersed in the aqueous medium of the composition, and activator, that is, an ingredient or ingredients which convert the composition into one which will form on a metallic surface a resinous coating which increases in thickness or a real density as long as the surface is immersed in the composition. Various types of activators or activating systems are known. The activating system generally comprises an acidic oxidizing system, for example: hydrogen peroxide and HF; $HNO_3$; a ferric ion containing compound and HF; and other combinations of (i) soluble metal containing compounds such as, for example, silver fluoride, ferrous oxide, cupric sulfate, cobaltous nitrate, silver acetate, ferrous phosphate, chromium fluoride, cadmium fluoride, stannous fluoride, lead dioxide, and silver nitrate, in an amount between about 0.025 and about 50 grams per liter (hereinafter often abbreviated as "g/L"), with (ii) one or more acids such as hydrofluoric, sulfuric, hydrochloric, nitric, and phosphoric acids and organic acids such as, for example, acetic, chloroacetic, and trichloroacetic acids.

Autodeposition composition can be used to form coatings which have good aesthetic properties and which protect the underlying metallic substrate from being degraded, e.g., corroded by water. Many applications however require the autodeposited coating have particularly good properties for use. Various means have been developed to improve the properties of autodeposited coatings including:

(a) chemical pretreatment of the metallic surface prior to forming the coatings;

(b) selection of specific particular resins which form the coating and (c) chemical post-treatment of the freshly formed or uncured coating.

U.S. Pat. No. 4,800,106, the entire disclosure of which, except to the extent that it may be inconsistent with any explicit statement herein, is hereby incorporated herein by reference, describes a number of references dealing with various treatments of uncured autodeposited coatings including the treatment of freshly formed autodeposited coatings with acidic, aqueous solution of one or more chromium compounds to improve corrosion resistance. While chemical treatments such as "reaction rinses" (which are defined as any rinses containing deliberately added ingredients other than water and air), following autodeposition coatings, can provide for improved corrosion resistance, gloss or other properties, oftentimes the treatment creates problems such as waste disposal problems. Thus the use of chromium containing compounds in post-treatment raises a disposal and environmental problem or disadvantage because the chromium must first be removed or otherwise treated before disposal to waste.

In the past, cold rolled steel and galvanized steel often required different autodeposited coatings, requiring different post-treatment, i.e. different reaction rinses for the coatings. One object of the present invention is to provide a process which includes a reaction rinse which will retain, or improve, the corrosion resistance properties of the autodeposited coating while employing non-chromium containing materials which are environmentally acceptable, raising no disposal problems.

A further object of the present invention is to provide a single reaction rinse for coatings on a variety of metal substrates, particularly on both cold rolled steel and galvanized steel. In this way a single reaction rinse may be used for composite objects that contain two or more distinct types of metal surface areas and autodeposited coatings thereon, so that simultaneous processing of such composite objects can be more efficiently carried out.

DESCRIPTION OF THE INVENTION

General Principles of Description

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to the objects of the invention); and the term "mole" and its variations may be applied to elemental, ionic, and any other chemical species defined by number and type of atoms present, as well as to compounds with well defined molecules.

SUMMARY OF THE INVENTION

In accordance with this invention, the corrosion resistance of a metal substrate coated with a dried and optionally cured autodeposited coating is improved from the level that would be achieved by rinsing the wet, uncured autodeposited coating with plain water, by treating the uncured coating on the metallic substrate with an aqueous rinse solution that comprises, preferably consists essentially of, or still more preferably consists of, water and anions that consist of (i) at least four fluorine atoms and (ii) at least one atom of an element selected from the group consisting of titanium, zirconium, hafnium, silicon, and boron and, optionally, (iii) one or more oxygen atoms; the rinse solution may also contain other ingredients, for such purposes as pH adjustment, or in general any other ingredients that do not act adversely to the objects of the invention. The anions may be introduced into the rinse solution by addition of the corresponding acids or of salts including the anions; in either case, the stoichiometric equivalent as the specified anions is considered for the purposes of this description to be present when any such material is dissolved in a treatment rinse solution, irrespective of the actual degree of ionization in the solution.

DESCRIPTION OF PREFERRED EMBODIMENTS

Except for use of a specific type of reaction rinse as described herein, a process according to this invention preferably is like those of prior art autodeposition processes. Thus, in a complete process, before autodeposition coating the metal substrate is preferably cleaned, generally using an alkaline, commercially available cleaner. The cleaning is carried out by spraying, immersion or any other effective method or combination of methods, after which the coated workpiece preferably is rinsed with water to remove any residual cleaning solution, prior to deposition of the coating. The autodeposited film is preferably applied by immersion of the substrate into a coating bath containing the desired polymer latex, emulsion or dispersion for a time sufficient to coat the substrate with a wet film thickness that preferably is, with increasing preference in the order given, at least 2, 4, 5, 6.0, 6.5, 6.8, 7.1, 7.4, 8.0, 9.0, 10, 11, 12, 13, 14, or 15 micrometers (hereinafter often abbreviated "μ") and independently preferably is, with increasing preference in the order given, not more than 50, 40, 30, 28, 27, 26, or 25 μ. The time and temperature during autodeposition will vary depending on the nature of the particular resins in the coating. After the coating is deposited, a reaction rinse is applied in the present invention to improve the corrosion resistance of the later formed cured coating.

The chemical composition of the autodeposition bath may be selected without limit from all the compositions that produce coatings useful for any purpose, in particular including those compositions taught in U.S. Pat. Nos. 3,585,084, 3,709,743, 3,776,848, 4,180,603, 4,191,676, 4,313,861, 4,347,172, 4,366,195, 4,657,788, all of which, to the extent that they describe compositions suitable for autodeposition baths and are not inconsistent with any explicit statement herein are hereby incorporated herein by reference.

Preferred coatings which are treated according to the process of the present invention are formed from an autodepositing composition in which particles of resin are dispersed in an aqueous acidic solution which is prepared by combining hydrofluoric acid and a soluble ferric iron-containing ingredient, most preferable ferric fluoride.

U.S. Pat. Nos. 4,347,172 and 4,411,937 which disclose the preferred activating system disclose the optional use in the composition of an oxidizing agent in an amount to provide from about 0.01 to about 0.2 oxidizing equivalent per liter of composition. Examples of suitable oxidizing agents are hydrogen peroxide, dichromate, permanganate, nitrate, persulfate, perborate, p-benzoquinone and p-nitrophenol. Hydrogen peroxide is most preferred.

With respect to particular resins that can be used in the coating composition of the present invention, one preferred class can be prepared by copolymerizing (A) vinylidene chloride monomer with (B) monomers such as methacrylic acid, methyl methacrylate, acrylonitrile, and vinyl chloride and (C) a water soluble ionic material such as sodium sulfoethyl methacrylate. Although the constituents comprising the above-desired resin can vary over a relatively wide range, in general the resin will comprise the polymerized constituents in the following amounts:

1) between 45 and 99%, based on the total weight of monomers used, of vinylidene chloride monomer;

2) from about 0.5 to 30 weight percent based on the total weight of(1) and (2) of a second relatively more hydrophilic ethylenically unsaturated monomeric material wherein such monomeric material has a solubility in both the water phase and the oil phase of the polymer latex of at least 1 weight percent at the temperature of polymerization; and 3) from about 0.1 to about 5 weight percent based on the total weight of other monomers of an ionic, significantly water-soluble material which is copolymerizable with (2) and is selected from the group of sulfonic acids and their salts having the formula:

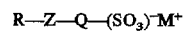

$$R-Z-Q-(SO_3)^-M^+$$

wherein the moiety "R" is selected from the group consisting of vinyl and substituted vinyl, for example, alkyl-substituted vinyl; the symbol "Z" represents a difunctional linking group which will activate the double bond in the vinyl group; —Q— is a divalent hydrocarbon moiety having its valence bonds on different carbon atoms; and the symbol "$M^+$" represents a cation.

Examples of resins prepared from such monomers are disclosed in U.S. Pat. No. 3,617,368.

The relatively hydrophilic monomers of (2) above include those materials which are readily copolymerizable with (1) in aqueous dispersion, that is, which copolymerize within a period of about 40 hours at a temperature ranging from the freezing point of the monomeric serum up to about 100° C., and which have a solubility in both the water and the oil phase of the polymer latex of at least 1 weight percent at the temperature of polymerization. Exemplary of preferred materials, particularly when used in conjunction with monomeric vinylidene chloride, are methacrylic acid and methyl methacrylate. Other monomers which may be advantageously employed include the hydroxyethyl and propyl acrylates, hydroxyethylmethacrylate, ethyl hexylacrylate, acrylic acid, acrylonitrile, methacrylonitrile, acrylamide, and the lower alkyl and dialkylacrylamides, acrolein, methyl vinyl ketone, and vinyl acetate.

These monomers, which can be employed in mounts of from 0.5 to 30 weight percent, based on the total weight of the nonionic monomers used, provide for the necessary reactivity with the copolymerizable ionic material of (3) and also provide for the required water solubility of the interpolymer in water. Thus, such materials may be referred to as "go-between" monomers. It is to be understood that the optimum mount of such relatively hydrophilic monomers may vary somewhat within the prescribed range depending upon the mount of hydrophobic monomer used in preparing the resin, as well as upon the amount and type of the copolymerizable ionic monomer used.

The copolymerizable ionic monomers used in preparing the aforementioned type resins are those monomeric materials which contain in their structure both an ionizable group and a reactive double bond, are significantly soluble in water, are copolymerizable with the hydrophilic monomer constituent (2) and in which the substituent on the double bond is chemically stable under the conditions normally encountered in emulsion polymerization.

Examples of the aforementioned divalent hydrocarbon moiety Q having its valence bonds on different carbon atoms include alkylene and arylene divalent hydrocarbon moieties. Although the alkylene group can contain up to about 20 carbon atoms, it preferably has 1 to about 8 carbon atoms.

The solubility of the defined copolymerizable ionic material as described herein is strongly influenced by the cation $M^+$. Exemplary cations are the hydrated protons characteristic of aqueous free acids, alkali metal ions, ammonium, sulfonium and substituted ammonium and sulfonium ions, including quaternary ammonium ions. Preferred are the free acids, alkali metals, particularly sodium and potassium, and ammonium.

It is further noted that, with one of the ions above, and the usual choices for R and Z, the solubility of the monomer depends on Q. As indicated, this group can be either aliphatic or aromatic and its size will determine the hydrophilic/hydrophobic balance in the molecule, that is, if Q is relatively small, the monomer is water soluble, but as Q becomes progressively larger, the surface activity of such monomer increases until it becomes a soap and ultimately a water insoluble wax. It is to be understood, however, that the limiting size of Q depends on R, Z, and $M^+$. As exemplary of the above, it has been found that sodium sulfoethyl methacrylate is a highly acceptable copolymerizable ionic material for use in the present invention.

Further, the selection of R and Z is governed by the reactivity needed, and the selection of Q is usually determined by the reaction used to attach the sulfonic acid to the base monomer (or vice versa).

Processes for preparing latexes containing resins of the aforementioned type are known, such latexes being commercially available and being referred to herein as "self-stabilizing latexes", that is, latexes, the polymeric parities of which contain in the polymer molecule functional groups that are effective in maintaining the polymeric particles dispersed in the aqueous phase of the latex. As mentioned above, such latexes do not require the presence of an external surfactant to maintain the particles in their dispersed state. Latexes of this type generally have a surface tension very close to that of water (about 72 dynes/cm). It has been observed that autodepositing compositions containing such latexes form coatings which build up at a relatively fast rate.

An exemplary method for preparing such latexes involves preparation of an aqueous dispersion by an essentially continuous, carefully controlled addition of the requisite polymerization constituents (including polymerization initiator systems, if desired) to the aqueous medium having the desired pH value, followed by the subsequent addition of the necessary polymerization initiator, to form a polymeric seed latex in order to aid in the control of particle size. When forming such polymeric seed latexes, very small amounts of conventional surfactants, such as alkali soaps or the like, may be incorporated in the aqueous medium to further aid in the attainment of particles of desired size. The addition of such surfactants, however, is not critical for the production of the highly stable, internally stabilized, aqueous colloidal dispersions of polymeric particles of the type described above. In any event, additions of surfactants are limited so that the total amount present in the aqueous phase of the final coating solution is less than the critical micelle concentration, as taught in U.S. Pat. No. 4,191,676. Following the formation of the polymeric seed latex, the remaining polymerization constituents are simultaneously and continuously added under carefully controlled conditions to the aqueous medium.

Highly stable polymer latexes for use in the present invention are characterized by the virtual absence of undesirable coagulum which often results when polymeric latexes are stabilized by conventional water soluble surfactants. Thus, such latexes combine the highly beneficial properties of optimum colloidal stability, reduced viscosities at relatively high polymer solids content, low foaming tendencies, and excellent product uniformity and reproducibility. Such highly stable latexes which are internally stabilized are disclosed, for example, in U.S. Pat. No. 3,617,368.

One preferred embodiment of this invention comprises the use of vinylidene chloride-containing latexes in which a water soluble ionic material such as, for example, sodium sulfoethyl methacrylate is copolymerized with the comonomers comprising the copolymer. Sodium sulfoethyl methacrylate is particularly effective for use with monomeric vinylidene chloride and the relatively hydrophilic monomers methyl methacrylate or methacrylic add when used in the amounts and in the manner called for by the present invention.

Particularly preferred latexes for use in this invention are latexes with about 35 to about 60 weight % solids comprising a polymeric composition prepared by emulsion polymerization of vinylidene chloride with one or more comonomers selected from the group consisting of vinyl chloride, acrylic acid, a lower alkyl acrylate (such as methyl acrylate, ethyl acrylate, butyl acrylate), methacrylic acid, methyl methacrylate, acrylonitrile, methacrylonitrile, acrylamide, and methacrylamide and stabilized with sulfonic acid or sulfonic acid salt of the formula R—Z—$(CH_2)_n$—$(SO_3)^-$ $M^+$, wherein R represents vinyl or lower alkyl-substituted vinyl; Z represents one of the difunctional groups:

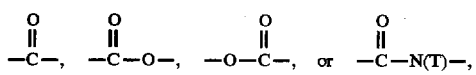

where T represents hydrogen or an alkyl group; n is an integer from 1 to 20, preferably 1 to 6, and M⁺ is hydrogen or an alkali metal cation, preferably sodium or potassium.

One subgroup of preferred polymers are those having at least 50% by weight of vinylidene chloride, but less than 70%, 5 to 35% vinyl chloride, and 5 to 20% of a vinyl compound selected from the group consisting of acrylic acid, methyl acrylate, ethyl acrylate, butyl acrylate, methacrylic acid, methyl methacrylate, acrylonitrile, methacrylonitrile, acrylamide and methacrylamide, and combinations thereof, and 1 to 3% by weight of sulfoethyl methacrylate.

One particularly preferred group of latexes, however, are latexes containing about 30 to about 70% of solids formed by emulsion polymerization of about 50 to about 99%, more preferably at least 80%, of vinylidene chloride, based on total weight of polymer, and about 0.1 to about 5% by weight of sulfoethyl methacrylate, with optionally other comonomers selected from the group consisting of vinyl chloride, acrylic and methacrylic monomers such as acrylonitriles, acrylamides, methacrylamides and mixtures thereof in amounts between about 5 and about 50% by weight, and substantially free of unpolymerized surfactant or protective colloid. Most preferably, the vinylidene chloride copolymer is crystalline in nature. Exemplary crystalline resins are described in U.S. Pat. No. 3,922,451 and aforementioned U.S. Pat. No. 3,617,368. In general, crystalline vinylidene chloride-containing resins have a relatively high proportion of vinylidene chloride, for example, at least about 80% thereof.

Internally stabilized polymers or resins include as part of their chemical structure a surfactant group which functions to maintain polymer particles or resin solids in a dispersed state in an aqueous medium, this being the function also performed by an "external surfactant", that is, by a material which has surface-active properties and which is absorbed on the surface of resin solids, such as those in colloidal dispersion. As is known, the presence of an external surfactant tends to increase the water sensitivity of coatings formed from aqueous resin dispersions containing the same and to adversely affect desired properties of the coatings. As described in U.S. Pat. No. 4,191,676, the presence of an undue amount of surfactant in autodepositing compositions can deter the build-up of resin particles on the metallic surface being coated. In addition, the presence of undue amounts of surfactant can also adversely affect desired coating properties, for example, corrosion resistant properties. An advantage of internally stabilized vinylidene chloride-containing polymers is that stable aqueous dispersions, including acidic aqueous dispersions of the type needed for autodepositing compositions, can be prepared without utilizing external surfactants. (It is noted that there is a tendency in the literature to use interchangeably the following terms in connection with describing surface active materials which are used in polymerization processes for preparing polymers of the type to which the present invention relates: surfactant, wetting agent, emulsifier or emulsifying agent, and dispersing agent. As used herein, the term "surfactant" is intended to be synonymous with the aforementioned.)

Various types of internally stabilized vinylidene chloride-containing polymers are known and species thereof are available commercially. Examples of such latexes are the SARAN™ latexes such as, for example, SARAN™ 143 and SARAN™ 112 available from Hampshire Chemical Corp., Lexington, Mass., USA and the SERFENE™ latexes available from Morton Chemical. In accordance with the present invention, these commercial latexes can be used to excellent advantage, and internally stabilized latexes in general are preferred.

Various surfactants which function to maintain polymeric particles in dispersed state in aqueous medium include organic compounds which contain ionizable groups in which the anionic group is bound to the principal organic moiety of the compound, with the cationic group being a constituent such as, for example, hydrogen, an alkali metal, and ammonium. Speaking generally, exemplary anionic groups of widely used surfactants contain sulfur or phosphorous, for example, in the form of sulfates, thiosulfates, sulfonates, sulfinates, sulfaminates, phosphates, pyrophosphates and phosphonates. Such surfactants comprise inorganic ionizable groups linked to an organic moiety.

Although various ways may be used to introduce into the molecular structure of the vinylidene chloride resin such ionizable groups, it is believed that the most widely used method for preparing such resins will involve reacting vinylidene chloride with a monomeric surfactant and optionally one or more other monomers. In such reaction, the monomeric surfactant comprises a material which is polymerizable with monomeric vinylidene chloride or with a monomeric material which is polymerizable with monomeric vinylidene chloride and which is ionizable in the reaction mixture and in the acidic aqueous medium comprising an autodepositing composition.

Among other preferred subclasses of resin for use in this invention are: dispersions of copolymers of 50 to 90% of butyl acrylate and 1 to 2% by weight of sulfoethyl methacrylate based on the total weight of polymer; latexes of vinylidene chloride-containing polymers internally stabilized with sulfoethyl methacrylate and free of other surfactant, and including optionally vinyl chloride and one or more acrylic comonomers; vinylidene chloride-containing copolymer having 15 to 20% of vinyl chloride, 2 to 5% butyl acrylate, 3 to 10 weight % acrylonitrile, and 1 to 2% of sulfoethyl methacrylate. This particular copolymer will have less than 70% by weight of vinylidene chloride copolymer based upon total weight of comonomers (including the sulfoethyl methacrylate) used in the emulsion polymerization.

The concentration of the resin in the coating composition can vary over a wide range. The lower concentration limit of the resin particles in the composition is dictated by the amount of resin needed to provide sufficient material to form a resinous coating. The upper limit is dictated by the amount of resin particles which can be dispersed in the acidic aqueous composition. In general, the higher the mount of resin particles in the composition, the heavier the coating formed, other factors being the same. Although coating compositions can be formulated with a range of about 5 to about 550 grams per liter (hereinafter often abbreviated "g/L") of resin solids, the amount of the resin solids will tend to vary depending on the other ingredients comprising the composition and also on the specific latex or resin used. For most uses, the concentration of binder resin solids in an autodeposition composition or bath used as part of a process according to this invention preferably is, with increasing preference in the order given, at lease 0.5, 1.0, 2.0, 3.0, 3.5, 4.0, 4.5, 4.7, or 4.9% and independently preferably is, with increasing preference in the order given, not more than 40, 30, 20, 17, 14, 12, 11, 10.5, or 10.0%.

Optional ingredients can be added to the composition as desired. For example, it is believed that the present invention will be used most widely in applications where it is desired to apply pigmented coatings to the metallic substrate. For this purpose, suitable pigments can be included in the composition. Examples of pigments that can be used are carbon black, phthalocyanine blue, phthalocyanine green, quinacridone red, benzidene yellow, and titanium dioxide. The pigment should be added to the composition in an amount which imparts to the coating the desired color and/or the desired depth or degree of hue. It should be understood that the specific amount used will be governed by the specific pigment used and the color of coating desired. Excellent results have been achieved by using the aqueous dispersion in an amount such that the composition contains about 0.2 to about 3 g of furnace black/100 g of resin solids.

Many pigments are available in aqueous dispersions which may include surfactants or dispersing agents for maintaining the pigment particles in dispersed state. When utilizing such pigment dispersions, they should be selected so that the surfactant concentration in the aqueous phase of the composition is below the critical micelle concentration ("CMC"), preferably below the surfactant concentration which corresponds to the inflection point on a graph of surface tension versus the logarithm of surfactant concentration in the composition. A suitable pigmented composition is illustrated in examples herein.

Colored coatings can be produced also by the use of dyes, examples of which include rhodamine derived dyes, methyl violet, safranine, anthraquinone derived dyes, nigrosine, and alizarin cyanine green. These are but a few examples of dyes that can be used.

Examples of other additives that may be used in the autodepositing composition are those generally known to be used in formulating paint compositions, for example, UV stabilizers, viscosity modifiers, etc.

If a surfactant is added to the composition, either as a component of the latex, or with a pigment dispersion, or with other ingredients or additives, the total amount of surfactant in the aqueous phase of the composition should be maintained below the CMC. Preferably, the aqueous phase of the composition contains little or no surfactant.

If an external surfactant is utilized, the preferred surfactants are anionic. Examples of suitable anionic surfactants are the alkyl, alkyl/aryl or naphthalene sulfonates, for example, sodium dioctylsulfosuccinate and sodium dodecylbenzene sulfonate.

In preparing the autodepositing composition, the constituents thereof can be admixed in any suitable way, for example, as described in U.S. Pat. No. 4,191,676. In preparing a bath of pigmented coating composition for use on an industrial scale, it is preferred that the bath be prepared by admixing:

A) an aqueous concentrate comprising about 350 to about 550 g/l of resin particles, preferable the aforementioned vinylidene chloride-containing resin particles, and about 10 to about 550 g/l of pigment; and B) an aqueous concentrate prepared from about 0.4 to about 210 g/l of HF and a water soluble ferric-containing compound in an amount equivalent to about 1 to about 100 g/l of ferric iron.

The bath can be prepared by stirring water into concentrate (A) and thereafter admixing therewith the required amount of concentrate (B) with stirring to provide a homogenous composition.

The complex fluoride anions required in a reaction rinse according to the invention are preferably added to the treatment solution in the form of nickel, ferric, or cobalt salts, more preferably cobalt salts, and the anions themselves are preferably fluoborate (i.e., $BF_4^-$, fluosilicate (i.e., $SiF_6^{-2}$), fluotitanate (i.e., $TiF_6^{-2}$ or fluozirconate (i.e., $ZrF_6^{-2}$) with the latter most preferred.

The concentration of the total of the complex fluoride anions present in the aqueous liquid rinse composition used according to the invention preferably is, with increasing preference in the order given, at least 0.002, 0.004, 0.008, 0.016, 0.023, 0.033, 0.040, 0.047, 0.054, 0.061, or 0.068 moles per liter ("M") and independently preferably is, with increasing preference in the order given, not more than 1.0, 0.7, 0.4, 0.20, 0.15, 0.100, 0.090, 0.080, 0.075, or 0.072M. The pH of the rinse solution used according to this invention preferably is, with increasing preference in the order given, not less than 1.0, 1.5, 1.8, 2.0, 2.5, 3.0, 3.1, 3.2, 3.3, 3.4, or 3.5 and independently preferably is, with increasing preference in the order given, not more than 9, 8, 7.0, 6.5, 6.0, 5.8, 5.6, 5.4, 5.2, 5.0, 4.9, 4.8, 4.7, 4.6, or 4.5.

The rinse solution may be contacted, according to the invention, with a wet uncured autodeposited coating by any convenient method or combination of methods, Such as spraying, curtain coating, or immersion, with the latter normally preferred. Preferably the time of contact between the rinse solution and the wet uncured autodeposited coating is, with increasing preference in the order given, not less than 5, 10, 20, 30, 40, 45, 50, 55, or 60 seconds (hereinafter often abbreviated "see") and independently preferably is, with increasing preference in the order given, not more than 600, 400, 200, 120, 110, 100, 95, or 90 sec. The temperature of the rinse solution during contact with a wet uncured autodeposited coating may be any temperature at which the rinse solution is liquid but normally preferably is, with increasing preference in the order given, not less than 10°, 15°, 18°, or 20° C. and independently preferably is, with increasing preference in the order given, not more than 60°, 45°, 35°, 30°, 27°, 25°, or 23° C.

After the reaction rinse treatment, the wet autodeposited coating as modified by contact with the reaction rinse is sometimes rinsed again with water, preferably deionized water if any, before being dried and, if desired as is usually preferred, cured by heating at an elevated temperature so selected that the protective properties of the coating are fully developed but not adversely affected. The temperature and time of treatment will depend on the nature of the particular resin in the autodeposited coating and the thickness of the coating. With autodeposition baths containing most types of organic binder resins, including the most preferred poly{vinylidene chloride} resins, during or after drying, the autodeposited coatings preferably are heated to a temperature that is, with increasing preference in the order given, at least 22°, 30°, 40°, 50°, 60°, 70°, 80°, 90°, 100°, 110°, or 120° C. and independently preferably is, with increasing preference in the order given, not more than 200°, 180°, 160°, 150°, 140°, 135°, 130°, 128°, or 126° C. Times of heating for curing preferably range from 5 seconds up to 30 minutes, dependent on the mass of the coated article. Preferably, the coating is heated for a period of time until the metallic substrate has reached the temperature of the heated environment, typically in a forced air baking oven.

The dried, cured coated articles are found to have excellent corrosion resistance when tested in soak tests or the neutral salt spray ("NSS") test, such as ASTM B-117 and scab corrosion cycles. Autodeposited coatings treated according to the present invention are particularly effective on both cold rolled steel and galvanized steel, thereby allowing the two types to be processed together.

To further illustrate the various objects and advantages of the present invention, the following examples, in which all parts and percentages are by weight unless otherwise indicated, are provided. It is understood that their purpose is entirely illustrative and in no way intended to limit the scope of the invention.

EXAMPLE 1

This example illustrates the preparation of a metallic surface having an autodeposited resinous coating. The metallic surface comprised steel panels, both cold rolled steel (CRS) and zinc galvanized steel (CS) panels, which were cleaned with a conventional alkaline cleaner composition and rinsed with water prior to being coated by immersion in the autodepositing composition at ambient temperature (about 21° C.) for about 90 seconds. The autodepositing immersion bath had the following composition: 60 grams per liter (hereinafter abbreviated as "g/L") of internally stabilized copolymer of vinylidene chloride, 2.5 g/L of carbon black, 0.4 g/L of HF, 1.5 g/L of ferric iron, and the balance water.

EXAMPLE 2

In this example, the uncured coated panels from example 1 are treated with a reaction rinse immersion bath after first being rinsed with water. The reaction rinse without cobalt cations contained 0.5% by weight of $H_2ZrF_6$ and was adjusted to the pH shown in the following tables with ammonia if needed. In the examples employing the cobalt salt of hydrofluorozirconic acid, the concentration is shown in the tables below; the pH was 3.5 for all the concentrations shown.

After immersion in the reaction rinse bath for one minute, the panels were then rinsed with water (deionized) and the panels were then cured for 20 minutes in an oven at a temperature of 105° C.

EXAMPLE 3

This example illustrates the results of corrosion resistance testing of various panels. Table 1 below illustrates salt spray performance and cyclic scab performance on galvanized steel, and Tables 2–7 indicate performance on other tests as noted.

The letters "GM" and the numbers and letters immediately following these letters in the headings of Tables 2–7 refer respectively to the General Motors Corporation and to various specific corrosion tests that are part of performance specifications at that company. Test details are readily available from General Motors. Briefly, the tests reported here are described as follows:

1. Cyclic Corrosion—GM 9511P

After preparation (1) the samples are heated in an oven at 60° C. for 1 hour followed by (2) 30 minutes at −25° C. The samples are then (3) immersed in a 5% NaCl solution at room temperature for 15 minutes, followed by (4) ambient drying for 75 minutes. The samples are then (5) held for 22.5 hours in a humidity chamber at 85% relative humidity ("RH") and 60° C. The foregoing is generally conducted over a 5-day period after which the 5 steps may be repeated for any desired number of cycles.

2. Cyclic Corrosion—GM 9540P, Cycle B

After preparation, the samples are treated at 25° C. and 50% RH environment for 8 hours, including 4 sprays at 90 minutes intervals with a solution containing 0.9% NaCl, 0.1% $CaCl_2$, and 0.25% $NaHCO_3$ in deionized water. The samples are then subjected to an 8 hour fog, 100% RH at 40° C., followed by 8 hours at 60° C. and less than 20% RH. The entire treatment is repeated for the desired number of cycles, usually 40 cycles.

TABLE 1

| | | | Corrosion Test Ratings (Paint Delamination from Scribe, mm) | |
|---|---|---|---|---|
| Reaction Rinse | Concentration | pH | NSS (336 hr) | 20 Cycles Scab |
| $H_2ZrF_6$ | 0.5% | 3 | 0–2 | |
| $H_2ZrF_6$ | 0.5% | 4 | 0–2 | |
| $H_2ZrF_6$ | 0.5% | 5 | 0–2 | 1.5 |
| $CoZrF_6$ | 4.5 g/L | 3.5 | 0–2 | 1.5 |
| $CoZrF_6$ | 9.0 g/L | 3.5 | 0–2 | 0.8 |
| $CoZrF_6$ | 18 g/L | 3.5 | 0–1 | 0.6 |

TABLE 2

(20 Cycles GM 9511 P on Cold Rolled Steel)

| Reaction Rinse | Coating Thickness, μ | Total Width Creepback (mm) | | | Gravel Rating | |
|---|---|---|---|---|---|---|
| | | Average | Maximum | Minimum | Impact Damage* | After 20 Cycles |
| 0.5% $H_2ZrF_6$ | 23 | 2.8 | 5.9 | 1.5 | 9 | 10% |
| pH 5 | 20 | 3.3 | 6.0 | 1.0 | 9 | rusted |
| $CoZrF_6$ | 23 | 3.7 | 5.9 | 1.5 | 9 | 10% |
| 4.5 g/L | 23 | 2.8 | 8.2 | 1.0 | 9 | rusted |

*Impact damage was measured as specified in GM 9508 P.

TABLE 3

(20 Cycles GM 9511 P on Galvanized Steel)

| Reaction Rinse | Coating Thickness, μ | Total Width Creepback (mm) | | | Gravel Rating | |
|---|---|---|---|---|---|---|
| | | Average | Maximum | Minimum | Before | After |
| 0.5% $H_2ZrF_6$ | 13 | 1.5 | 3.1 | 0.2 | 8 | 8 |
| pH 5 | 17 | 0.6 | 1.9 | 0.2 | 8 | 8 |
| $CoZrF_6$ | 15 | 0.7 | 2.6 | 0.2 | 8 | 8 |
| 4.5 g/L | 13 | 0.4 | 3.1 | 0.2 | 8 | 8 |

TABLE 4

(40 Cycles GM 9540 P, Cycle B, on Cold Rolled Steel)

| Reaction Rinse | Coating Thickness, μ | Total Width Creepback (mm) | | | Field |
|---|---|---|---|---|---|
| | | Average | Maximum | Minimum | |
| 0.5% $H_2ZrF_6$ | 20 | 6.6 | 9.8 | 4.2 | 10% rusted |
| pH 5 | 20 | 6.5 | 9.5 | 3.8 | |
| $CoZrF_6$ | 20 | 12.1 | 22.6 | 4.5 | 20% rusted |
| 4.5 g/L | 23 | 9.6 | 14.8 | 3.9 | |

TABLE 5

(40 Cycles Gm 9540 P, Cycle B, on Galvanized Steel)

| Reaction Rinse | Coating Thickness, μ | Total Width Creepback (mm) | | | Field |
|---|---|---|---|---|---|
| | | Average | Maximum | Minimum | |
| 0.5% | 10 | 0.7 | 4.2 | 0.2 | 60% rusted |
| H$_2$ZrF$_6$ | 11 | 1.0 | 2.7 | 0.2 | |
| pH 5 | | | | | |
| CoZrF$_6$ | 16 | 0.7 | 2.2 | 0.2 | 10% rusted |
| 4.5 g/L | 15 | 0.8 | 2.6 | 0.2 | |

TABLE 6

(5 cycles GM 9505 P, Cycle J, on Cold Rolled Steel)

| Reaction Rinse | Coating Thickness, μ | Maximum Creepback from Scribe (mm) | | |
|---|---|---|---|---|
| | | Right | Left | Total |
| 0.5% H$_2$ZrF$_6$ | 23 | 2.6 | 2.9 | 5.5 |
| pH 5 | 20 | 2.7 | 2.8 | 5.5 |
| CoZrF$_6$ | 20 | 3.4 | 3.0 | 6.4 |
| 4.5 g/L | 20 | 2.4 | 2.9 | 5.3 |

TABLE 7

(5 Cycles GM 9505 P, Cycle J, on Galvanized Steel)

| Reaction Rinse | Coating Thickness, μ | Maximum Creepback from Scribe (mm) | | |
|---|---|---|---|---|
| | | Right | Left | Total |
| 0.5% H$_2$ZrF$_6$ | 13 | 2.8 | 3.1 | 5.9 |
| pH 5 | 15 | 3.0 | 2.7 | 5.7 |
| CoZrF$_6$ | 14 | 0.2 | 0.2 | 0.4 |
| 4.5 g/L | 12 | 0.2 | 0.2 | 0.4 |

3. Cyclic Corrosion—GM 9505P, Cycle J

After preparation, the samples are (1) held in a freezer at −30° C. for 2 hours, followed by ambient conditions for 2 hours and subsequently (2) in an oven at 70° C. for 2 hours. The samples are then (3) subjected to a 5% NaCl solution salt spray for 2 hours and then (4) held in a humidity chamber at 38° C. and 95% RH for 64 hours. The samples are then (5) held in an oven at 60° C. for 1 hour followed by (6) a freezer at −30° C. for 30 minutes. The samples are then subjected to (7) immersion in a 5% NaCl solution at room temperature for 15 minutes and then (8) held at ambient conditions for 1.25 hours, followed by (9) a humidity chamber at 60° C. and 85% RH for 6.5 hours, followed (10) by 38° C. for 64 hours. Steps (1)–(4) above are then repeated to complete the cycle which is generally concluded in a 2-week period.

The invention claimed is:

1. A process for providing a metal substrate surface with a protective coating containing an organic binder, said process comprising steps of:
   (A) contacting a metal substrate surface with a liquid autodeposition composition containing dispersed organic binder for a sufficient time to form a wet adherent film on the surface of said metal substrate wherein said wet adherent film includes said organic binder deposited from the autodeposition composition;
   (B) separating the substrate bearing the wet adherent film formed in step (A) from further contact with the autodeposition composition and contacting the wet adherent film with an aqueous liquid rinse solution comprising
      (1)) water;
      (2) anions wherein said anions consist of (i) at least four fluorine atoms and (ii) at least one atom of an element selected from the group consisting of titanium, zirconium, hafnium, silicon, and boron and, optionally, (iii) one or more oxygen atoms; and
      (3) a stoichiometric amount of counterions for said anions;
   said solution including only non-chromium-containing materials thereby raising no disposal problems created by the use of chromium-containing compounds; and
   (C) separating the substrate bearing the wet adherent film as modified by the contacting of step (B) from the aqueous liquid rinse solution used in step (B) and subsequently drying the wet film into place on the substrate to produce a dry film.

2. A process, of providing a metal substrate surface with a protective coating containing an organic binder, said process comprising steps of
   (A) contacting a metal substrate surface with a liquid autodeposition composition containing dispersed organic binder for a sufficient time to form a wet adherent film on the surface of said metal substrate wherein said wet adherent film includes said organic binder deposited from the autodeposition composition;
   (B) separating the substrate bearing the wet adherent film formed in step (A) from further contact with the autodeposition composition and contacting the wet adherent film with an aqueous liquid rinse solution comprising
      (1) water;
      (2) anions wherein said anions consists of (i) at least four fluorine atoms and (ii) at least one atom of an element selected from the group consisting of titanium, zirconium, hafnium, silicon and optionally, (iii) one or more oxygen atoms; and
      (3) counterions,
   (C) separating the substrate bearing the wet adherent film as modified by the contacting of step (B) from the aqueous liquid rinse solution used in step (B) and subsequently drying the wet film into place on the substrate to produce a dry film, wherein the aqueous liquid rinse solution contains a total of about 0.002 moles per liter of solution to about 1.0 moles per liter of solution of said anions and said ions are selected from the group consisting of fluoborate, fluosilicate, fluotitanate, and fluozirconate anions and wherein said solution includes only non-chromium-containing materials thereby raising no disposal problems created by the use of chromium-containing compounds.

3. A process as defined in claim 2, wherein the aqueous liquid rinse solution has a pH from about 1.8 to about 9 and contains a total of about 0.008 moles per liter of solution to about 0.7 moles per liter of solution of anions selected from the group consisting of fluoborate, fluosilicate, fluotitanate, and fluozirconate anions.

4. A process as defined in claim 3, wherein the aqueous liquid rinse solution has a pH from about 2.5 to about 6.0 and contains a total of about 0.016 moles per liter of solution to about 0.4 moles per liter of solution of anions selected from the group consisting of fluoborate, fluosilicate, fluotitanate, and fluozirconate anions.

5. A process as defined in claim 4, wherein the aqueous liquid rinse solution has a pH from about 3.0 to about 5.4 and contains a total of about 0.023 moles per liter of solution and to about 0.075 moles per liter of solution of fluozirconate anions.

6. A process as defined in claim 5, wherein the aqueous liquid rinse solution contains an amount of cobalt cations sufficient to form salts with its total content of fluozirconate anions.

7. A process as defined in claim 4, wherein the aqueous liquid rinse solution contains a total of ferric, nickel, and cobalt cations sufficient to form salts with its total content of fluoborate, fluosilicate, fluotitanate, and fluozirconate anions.

8. A process as defined in claim 3, wherein the aqueous liquid rinse solution contains a total of ferric, nickel, and cobalt cations sufficient to form salts with its content of fluoborate, fluosilicate, fluotitanate, and fluozirconate anions.

9. A process as defined in claim 2, wherein the aqueous liquid rinse solution contains a total of ferric, nickel, and cobalt cations sufficient to form salts with its content of fluoborate, fluosilicate, fluotitanate, and fluozirconate anions.

10. A process as defined in claim 1, wherein said aqueous liquid rinse solution contains anions selected from the group consisting of fluoborate, fluosilicate, fluotitanate and fluozirconate anions and wherein the aqueous liquid rinse solution contains a total of ferric, nickel, and cobalt cations sufficient to form salts with its content of fluoborate, fluosilicate, fluotitanate, and fluozirconate anions.

11. A process according to claim 10, wherein the autodeposition composition contains a dispersed resin that is a copolymer of at least one of vinylidene chloride and butyl acrylate.

12. A process according to claim 9, wherein the autodeposition composition contains from about 5 to about 12% of dispersed resin made by copolymerizing:
1) between about 45 and about 99%, based on the total weight of monomers used, of vinylidene chloride monomer;
2) from about 0.5 to 30 weight percent, based on the total weight of (1) and (2), of a second relatively more hydrophilic ethylenically unsaturated monomeric material that has a solubility in both the water phase and the oil phase of the polymer latex of at least 1 weight percent at the temperature of polymerization; and
3) from about 0.1 to about 5 weight percent, based on the total weight of other monomers of an ionic, significantly water-soluble material which is copolymerizable with (2) and is selected from the group of sulfonic acids and their salts having the formula:

wherein: "R" is selected from the group consisting of vinyl and substituted vinyl; "Z" represents a difunctional linking group which will activate the double bond in the vinyl group; —Q— is a divalent hydrocarbon having its valence bonds on different carbon atoms; and "M$^+$" represents a cation.

13. A process according to claim 8, wherein the autodeposition composition contains from about 5 to about 12% of dispersed resin made by copolymerizing:
1) between about 45 and about 99%, based on the total weight of monomers used, of vinylidene chloride monomer;
2) from about 0.5 to 30 percent, based on the total weight of (1) and (2), of a second relatively more hydrophilic ethylenically unsaturated monomeric material that has a solubility in both the water phase and the oil phase of the polymer latex of at least 1 weight percent at the temperature of polymerization; and
3) from about 0.1 to about 5 percent, based on the total weight of other monomers of an ionic, significantly water-soluble material which is copolymerizable with (2) and is selected from the group of sulfonic acids and their salts having the formula:

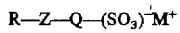

wherein: "R" is selected from the group consisting of vinyl and substituted vinyl; "Z" represents a difunctional linking group which will activate the double bond in the vinyl group; —Q— is a divalent hydrocarbon having its valence bonds on different carbon atoms; and "M$^+$" represents a cation.

14. A process according to claim 7, wherein the autodeposition composition contains from about 5 to about 12% of dispersed resin made by copolymerizing:
1) between about 45 and about 99%, based on the total weight of monomers used, of vinylidene chloride monomer;
2) from about 0.5 to 30 weight percent, based on the total weight of (1) and (2), of a second relatively more hydrophilic ethylenically unsaturated monomeric material that has a solubility in both the water phase and the oil phase of the polymer latex of at least 1 weight percent at the temperature of polymerization; and
3) from about 0.1 to about 5 weight percent, based on the total weight of other monomers of an ionic, significantly water-soluble material which is copolymerizable with (2) and is selected from the group of sulfonic acids and their salts having the formula:

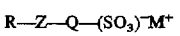

wherein: "R" is selected from the group consisting of vinyl and substituted vinyl; "Z" represents a difunctional linking group which will activate the double bond in the vinyl group; —Q— is a divalent hydrocarbon having its valence bonds on different carbon atoms; and "M$^+$" represents a cation.

15. A process according to claim 6, wherein the autodeposition composition contains from about 5 to about 10% of dispersed resin made by copolymerizing:
1) between about 80 and about 99%, based on the total weight of monomers used, of vinylidene chloride monomer;
2) from about 0.5 to 19 weight percent, based on the total weight of (1) and (2), of monomers selected from the group consisting of acrylonitriles, acrylamides, and methacrylamides that have a solubility in both the water phase and the oil phase of the polymer latex of at least 1 weight percent at the temperature of polymerization; and
3) from about 0.1 to about 5 weight percent, based on the total weight of other monomers of an ionic, significantly water-soluble material which is copolymerizable with (2) and is selected from the group of sulfonic acids and their salts having the formula:

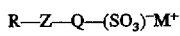

wherein: "R" is selected from the group consisting of vinyl and substituted vinyl; "Z" represents a difunctional linking group which will activate the double bond in the vinyl group; —Q— is a divalent hydrocarbon having its valence bonds on different carbon atoms; and "M⁺" represents a cation.

16. A process according to claim 5, wherein the autodeposition composition contains from about 5 to about 10% of dispersed resin made by copolymerizing:

1) between 45 and 99%, based on the total weight of monomers used, of vinylidene chloride monomer;
2) from about 0.5 to about 19 weight percent, based on the total weight of (1) and (2), of monomers selected from the group consisting of acrylonitriles, acrylamides, and methacrylamides that have a solubility in both the water phase and the oil phase of the polymer latex of at least 1 weight percent at the temperature of polymerization; and
3) from about 0.1 to about 5 weight percent, based on the total weight of other monomers of an ionic, significantly water-soluble material which is copolymerizable with (2) and is selected from the group of sulfonic acids and their salts having the formula:

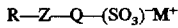

wherein: "R" is selected from the group consisting of vinyl and substituted vinyl; "Z" represents a difunctional linking group which will activate the double bond in the vinyl group; —Q— is a divalent hydrocarbon having its valence bonds on different carbon atoms; and "M⁺" represents a cation.

17. A process according to claim 4, wherein the autodeposition composition contains from about 5 to about 12% of dispersed resin made by copolymerizing:

1) between 45 and 99%, based on the total weight of monomers used, of vinylidene chloride monomer;
2) from about 0.5 to 30 weight percent, based on the total weight of (1) and (2), of a second relatively more hydrophilic ethylenically unsaturated monomeric material that has a solubility in both the water phase and the oil phase of the polymer latex of at least 1 weight percent at the temperature of polymerization; and
3) from about 0.1 to about 5 weight percent, based on the total weight of other monomers of an ionic, significantly water-soluble material which is copolymerizable with (2) and is selected from the group of sulfonic acids and their salts having the formula:

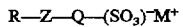

wherein: "R" is selected from the group consisting of vinyl and substituted vinyl; "Z" represents a difunctional linking group which will activate the double bond in the vinyl group; —Q— is a divalent hydrocarbon having its valence bonds on different carbon atoms; and "M⁺" represents a cation.

18. A process according to claim 3, wherein the autodeposition composition contains from about 5 to about 12% of dispersed resin made by copolymerizing:

1) between 45 and 99%, based on the total weight of monomers used, of vinylidene chloride monomer;
2) from about 0.5 to 30 weight percent, based on the total weight of (1) and (2), of a second relatively more hydrophilic ethylenically unsaturated monomeric material that has a solubility in both the water phase and the oil phase of the polymer latex of at least 1 weight percent at the temperature of polymerization; and
3) from about 0.1 to about 5 weight percent, based on the total weight of other monomers of an ionic, significantly water-soluble material which is copolymerizable with (2) and is selected from the group of sulfonic acids and the salts having the formula:

wherein: "R" is selected from the group consisting of vinyl and substituted vinyl; "Z" represents a difunctional linking group which will activate the double bond in the vinyl group; —Q— is a divalent hydrocarbon having its valence bonds on different carbon atoms; and "M⁺" represents a cation.

19. A process according to claim 2, wherein the autodeposition composition contains from about 5 to about 12% of dispersed resin made by copolymerizing:

1) between 45 and 99%, based on the total weight of monomers used, of vinylidene chloride monomer;
2) from about 0.5 to 30 weight percent, based on the total weight of (1) and (2), of a second relatively more hydrophilic ethylenically unsaturated monomeric material that has a solubility in both the water phase and the oil phase of the polymer latex of at least 1 weight percent at the temperature of polymerization; and
3) from about 0.1 to about 5 weight percent, based on the total weight of other monomers of an ionic, significantly water-soluble material which is copolymerizable with (2) and is selected from the group of sulfonic acids and the salts having the formula:

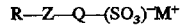

wherein: "R" is selected from the group consisting of vinyl and substituted vinyl; "Z" represents a difunctional linking group which will activate the double bond in the vinyl group; —Q— is a divalent hydrocarbon having its valence bonds on different carbon atoms; and "M⁺" represents a cation.

20. A process according to claim 1, wherein the autodeposition composition contains a dispersed resin that is a copolymer of at least one of vinylidene chloride and butyl acrylate.

21. A process for providing a metal substrate surface with a protective coating containing an organic binder, said process comprising steps of (A) contacting a metal substrate surface with a liquid autodeposition composition containing dispersed organic binder for a sufficient time to form a wet adherent film on the surface of said metal substrate wherein said wet adherent film includes said organic binder deposited from the autodeposition composition;

(B) separating the substrate bearing the wet adherent film formed in step (A) from further contact with the autodeposition coating and contacting the wet adherent film with an aqueous liquid rinse solution;

(C) separating the substrate bearing the wet adherent film as modified by the contacting of step (B) from the aqueous liquid rinse solution used in step (B) and subsequently drying the wet film into place on the substrate to produce a dry film;

wherein said aqueous liquid rinse comprises
 (1) water; and
 (2) fluozirconate ions in an amount of from 0.002 moles per liter to about 1.0 mole per liter and,
 (3) cobalt counterions, said aqueous liquid rinse solution including only non-chromium-containing materials thereby raising no disposal problems created by the use of chromium-containing compounds.

* * * * *